US010190579B2

(12) United States Patent
Ito et al.

(10) Patent No.: US 10,190,579 B2
(45) Date of Patent: Jan. 29, 2019

(54) RECIPROCATING COMPRESSOR

(71) Applicant: HITACHI AUTOMOTIVE SYSTEMS, LTD., Ibaraki (JP)

(72) Inventors: Tsutomu Ito, Sagamihara (JP); Hiroshi Fukudome, Nagoya (JP); Naofumi Harada, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 224 days.

(21) Appl. No.: 15/329,783

(22) PCT Filed: May 28, 2015

(86) PCT No.: PCT/JP2015/065408
§ 371 (c)(1),
(2) Date: Jan. 27, 2017

(87) PCT Pub. No.: WO2016/017259
PCT Pub. Date: Feb. 4, 2016

(65) Prior Publication Data
US 2017/0218933 A1 Aug. 3, 2017

(30) Foreign Application Priority Data

Jul. 31, 2014 (JP) .................................. 2014-156857

(51) Int. Cl.
*F16F 15/28* (2006.01)
*F04B 39/00* (2006.01)
(Continued)

(52) U.S. Cl.
CPC .......... *F04B 39/0027* (2013.01); *F04B 35/01* (2013.01); *F04B 35/04* (2013.01);
(Continued)

(58) Field of Classification Search
CPC ...... F04B 39/0094; F04B 53/006; F16C 3/20; F16F 15/26; F16F 15/283
See application file for complete search history.

(56) References Cited

U.S. PATENT DOCUMENTS 7,100,743 B2 * 9/2006 Park .................... F04B 39/0246
184/6.16
2004/0141855 A1 7/2004 Wang
2004/0241013 A1 12/2004 Park et al.

FOREIGN PATENT DOCUMENTS

JP 4-164166 6/1992
JP 6-2657 1/1994
(Continued)

OTHER PUBLICATIONS

International Search Report dated Aug. 18, 2015 in International Application No. PCT/JP2015/065408.

*Primary Examiner* — F. Daniel Lopez
(74) *Attorney, Agent, or Firm* — Wenderoth, Lind & Ponack, L.L.P.

(57) ABSTRACT

A balance weight includes a main weight portion extending over a range defined by a circular-arc circumferential edge centered at a rotational shaft hole side and a pair of virtual end surfaces located on the circular-arc circumferential edge on both sides of the rotational shaft hole, a pair of extension weight portions extending from the pair of virtual end surfaces to an opposite circular-arc side of the rotational shaft hole from the circular-arc circumferential edge, the rotational shaft hole provided at the main weight portion so as to be located on a central side of the circular-arc circumferential edge, a crank shaft attachment protrusion, a crank shaft hole provided at the crank shaft attachment protrusion radially eccentrically with respect to the rotational shaft hole, and a pair of spaces formed between positions on both (Continued)

sides of the crank shaft attachment protrusion and the pair of extension weight portions, respectively.

5 Claims, 10 Drawing Sheets

(51) Int. Cl.
| | | |
|---|---|---|
| *F04B 35/01* | (2006.01) | |
| *F04B 39/06* | (2006.01) | |
| *F16C 37/00* | (2006.01) | |
| *F16C 9/02* | (2006.01) | |
| *F04B 35/04* | (2006.01) | |
| *F04B 39/12* | (2006.01) | |
| *F16C 3/20* | (2006.01) | |
| *F16F 15/26* | (2006.01) | |

(52) U.S. Cl.
CPC ...... *F04B 39/0005* (2013.01); *F04B 39/0022* (2013.01); *F04B 39/0094* (2013.01); *F04B 39/06* (2013.01); *F04B 39/12* (2013.01); *F04B 39/128* (2013.01); *F16C 3/20* (2013.01); *F16C 9/02* (2013.01); *F16C 37/00* (2013.01); *F16C 37/007* (2013.01); *F16F 15/26* (2013.01); *F16F 15/283* (2013.01)

(56) References Cited

FOREIGN PATENT DOCUMENTS

| | | |
|---|---|---|
| JP | 9-112425 | 5/1997 |
| JP | 2005-513326 | 5/2005 |
| JP | 2005-171914 | 6/2005 |
| JP | 2014-114724 | 6/2014 |

* cited by examiner

RECIPROCATING COMPRESSOR

TECHNICAL FIELD

The present invention relates to a reciprocating compressor preferably usable to supply and discharge compressed air for adjusting a vehicle height to and from an air suspension mounted on, for example, a four-wheeled automobile.

BACKGROUND ART

Generally, an air suspension mounted on a pellicle as a vehicle height adjustment apparatus functions to prevent or reduce a change in a height of a vehicle (a vehicle height) according to, for example, a change in a weight of a load thereon, and also supply and discharge compressed air from and to an in-vehicle air compressing machine (an air compressor) to appropriately adjust the vehicle height according to, for example, a preference of a driver.

Then, the in-vehicle air compressor, which supplies the compressed air to the air suspension, drives a reciprocating compressor with use of an electric motor, thereby functioning to compress air introduced in this reciprocating compressor and supply the compressed air to the air suspension.

The reciprocating compressor includes a crank case, a cylinder attached to this crank case, a piston reciprocatably fittedly inserted in this cylinder, a connection rod extending from this piston, a crank shaft inserted through one end of this connection rod via a bearing, a rotational shaft configured to be rotationally driven by a motor, and a balance weight attached to this rotational shaft with the crank shaft attached thereto and configured to be usable to balance a moment generated when this rotational shaft rotates (for example, refer to PTL 1). Further, some reciprocating compressors are configured in such a manner that a balance weight (a fly wheel) is formed as a compact structure and is provided along an entire circumference (360 degrees) of a rotational shaft so as to surround the rotational shaft for the purpose of securing a weight (for example, refer to PTL 2).

CITATION LIST

Patent Literature

PTL 1: Japanese Patent Application Public Disclosure No. H9-112425
PTL 2: Japanese Patent Application Public Disclosure No. H6-2657

SUMMARY OF INVENTION

In the reciprocating compressor discussed in PTL 2, the balance weight (the fly wheel) is provided along the entire circumference (360 degrees) of the rotational shaft so as to surround the rotational shaft. Therefore, this reciprocating compressor involves such a problem that a bearing provided on the crank shaft is unintentionally covered by the balance weight, which makes it difficult for cooling wind to reach this bearing, resulting in an increase in a temperature thereof.

An object of the present invention is to provide a reciprocating compressor capable of improving a cooling performance of the bearing of the crank shaft while securing the weight of the balance weight.

To achieve the above-described object, a configuration employed by the present invention is characterized in that this configuration includes a crank case, a cylinder attached to this crank case, a piston reciprocatably fittedly inserted in this cylinder, a connection rod extending from this piston, a crank shaft inserted through one side of this connection rod via a bearing, a rotational shaft configured to be rotationally driven by a motor, and a balance weight attached to this rotational shaft with the crank shaft also attached thereto and configured to be usable to balance a moment generated when this rotational shaft rotates. The balance weight includes a main weight portion extending over a range defined by a circular-arc circumferential edge shaped like a circular arc centered at one side where the rotational shaft is located and a pair of virtual end surfaces located on this circular-arc circumferential edge on both sides of the rotational shaft, a pair of extension weight portions extending from the pair of virtual end surfaces of the main weight portion to an opposite circular-arc side from the circular-arc circumferential edge, a rotational shaft hole provided at the main weight portion so as to be located on a central side of the circular arc of the circular-arc circumferential edge of the main weight portion and attached to the rotational shaft, a crank shaft attachment protrusion provided so as to protrude from this rotational shaft hole to the opposite circular-arc side, a crank shaft hole provided at this crank shaft attachment protrusion radially eccentrically with respect to the rotational shaft hole, and a pair of spaces formed between positions on both sides of the crank shaft attachment protrusion and the pair of extension weight portions, respectively, for guiding cooling wind to the bearing of the crank shaft.

According to the present invention, it is possible to improve a cooling performance of the bearing of the crank shaft while securing a weight of the balance weight.

DESCRIPTION OF EMBODIMENTS

In the following, reciprocating compressors according to embodiments of the present invention will be described in detail with reference to the accompanying drawings, citing an oscillation-type reciprocating air compressor as an example thereof.

Figure 1:
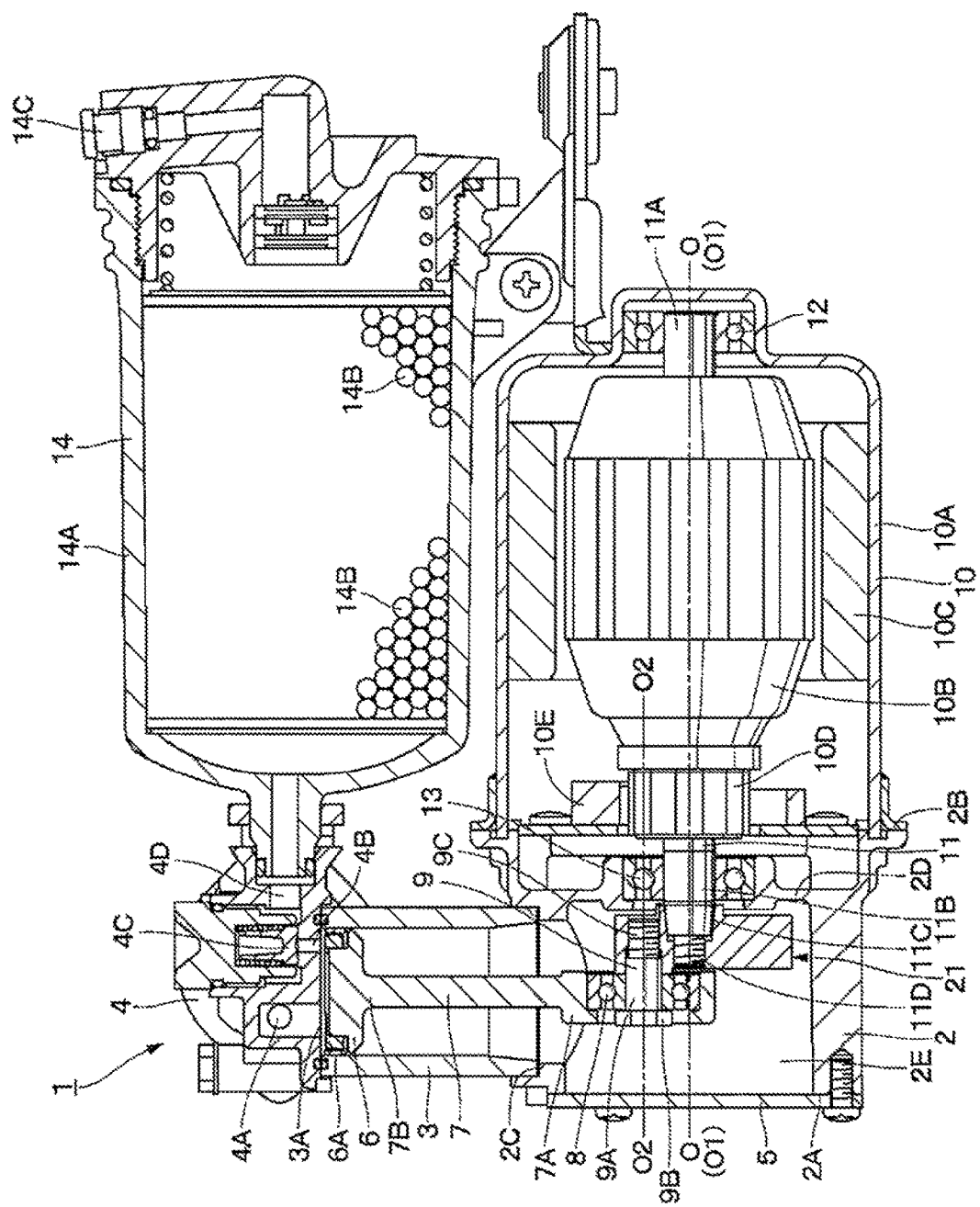
FIG. 1 is a vertical cross-sectional view illustrating a reciprocating compressor according to a first embodiment of the present invention.
Figure 2:
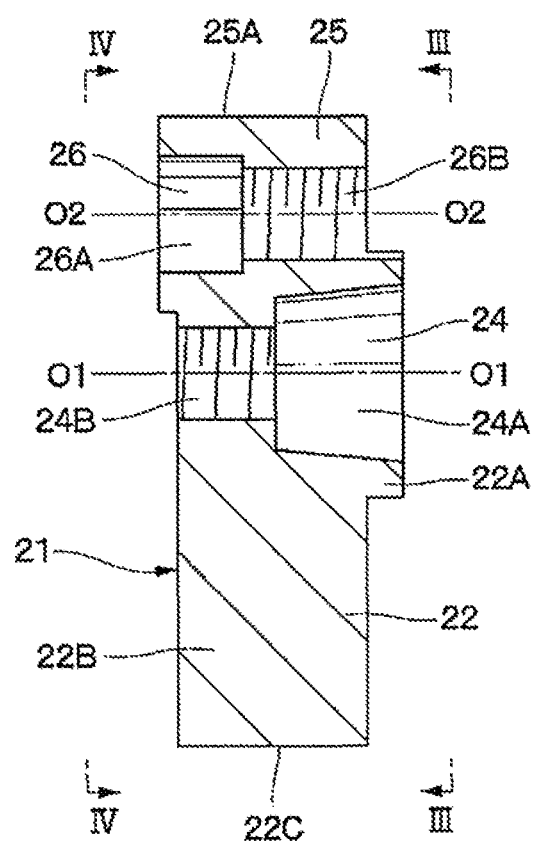
FIG. 2 is a vertical cross-sectional view focusing on a balance weight illustrated in FIG. 1, and illustrating this balance weight alone and in an enlarged manner.

First, FIGS. 1 to 6 illustrate a first embodiment of the present invention. In FIG. 1, an oscillation-type reciprocating air compressor 1 includes a crank case 2, a cylinder 3, a piston 6, a connection rod 7, a crank shaft 9, a rotational shaft 11, and a balance weight 21, which will be described below.

The crank case 2 of the air compressor 1 is formed as a hollow container made from a metallic material, such as an aluminum material. The crank case 2 includes a cover body attachment surface 2A and a motor attachment surface 2B respectively on a front side and a rear side thereof in a direction along an axis O-O of the rotational shaft 11, which will be described below. A cylinder attachment surface 2C is provided to the crank case 2 so as to be located between the cover body attachment surface 2A and the motor attachment surface 2B. Further, an annular bearing support portion 2D is formed at the crank case 2 by reducing a diameter at a position internally deepened from the motor attachment surface 2B. A cover body 5, which will be described below, is attached to the cover body attachment surface 2A so as to close an opening prepared for assembly work. Then, a rotational shaft bearing 13, which will be described below, is attached to the bearing support portion 2D.

In the crank case 2, a crank chamber 2E is defined by a space surrounded by the cover body attachment surface 2A, the motor attachment surface 2B, the cylinder attachment surface 2C, and the like. The connection rod 7, the crank shaft 3, the balance weight 21, and the like, which will be described below, are disposed in this crank chamber 2E while being coupled to one another.

The cylinder 3 is attached to the cylinder attachment surface 2C of the crank case 2. This cylinder 3 is cylindrically formed with use of, for example, an aluminum material. Then, the piston 6, which will be described below, is reciprocatably fittedly inserted inside this cylinder 3. The cylinder 3 includes a proximal end side attached to the cylinder attachment surface 2O and a distal and side to which a cylinder head 4 is attached. Then, a compression chamber 3A is formed between the cylinder head 4 and the piston 6 in the cylinder 3.

The cylinder head 4 is attached to the distal end side or the cylinder 3 so as to close the distal end side of this cylinder 3. An intake port 4A and a discharge port 4B are provided at this cylinder head 4. The intake port 4A is used to introduce external air (atmospheric air) into the compression chamber 3A. The discharge port 4B is used to discharge the air compressed in the compression chamber 3A. Further, an intake valve (not illustrated) and a discharge valve 4C are provided at the cylinder head 4. The intake valve opens the intake port 4A during an intake phase of the piston 6 and closes the intake port 4A during a discharge phase of the piston 6. The discharge valve 4C closes the discharge port 4B during the intake phase of the piston 6, and opens the discharge port 4E during the discharge phase of the piston 6. The discharge port 4B is in communication with a connection port 4D via the discharge valve 4C. An air dryer 14, will be described below, is connected to the connection port 4D.

The cover body 5 is attached to the cover body attachment surface 2A of the crank case 2. This cover body 5 serves to cover the opening for conducting the assembly work, maintenance work, and the like, i.e., the opening of the cover body attachment surface 2A so as to be able to open and close this opening.

The piston 6 is reciprocatably (slidably) fittedly inserted in the cylinder 3. This piston 6 functions to compress the air introduced from outside in the compression chamber 3A in the cylinder 3, and is formed as an oscillation-type piston (a rocking piston). The piston 6 is made of a disk member having a diameter dimension slightly smaller than an inner diameter dimension of the cylinder 3, and includes a lip seal 6A attached around it.

This lip seal 6A surrounds an outer peripheral side of the piston 6, thereby functioning to air-tightly seal between an outer peripheral surface of this piston 6 and an inner peripheral surface or the cylinder i.e., the compression chamber 3A. Further, assuming that a front side is one side of the piston 6 where the compression work is performed (a compression chamber 3A side), the connection rod 7, which will be described below, is integrally attached to a central portion of a back surface of an opposite side.

The connection rod 7 is provided so as to extend from the central portion of the back surface of the piston 6. A distal end side that is one side of the connection rod 7 serves as a cylindrical bearing support portion 7A while being located in the crank chamber 2E of the crank case 2, and a crank bearing 8 is fittedly inserted in this bearing support portion 7A. On the other hand, an opposite end 7B of the connection rod 7, which corresponds to a piston 6 side, is integrally attached to the central portion of the back surface of the piston 6. Then, the bearing support portion 7A of the connection rod 7 is rotatably attached to the crank shaft 9, which will be described below, via the crank bearing 8.

Then, the crank bearing 8 is configured as a ball bearing including an inner race, an outer race, and a plurality of balls. The inner race and the outer race of the crank bearing 8 are attached to the crank shaft 9 and the bearing support portion 7A of the connection rod 7, respectively.

The crank shaft 9 is inserted through the bearing support portion 7A of the connection rod 7 via the crank bearing 8. This crank shaft 9 includes a columnar shaft portion 9A, a head portion 9B formed by increasing a diameter of a proximal end side of this shaft portion 9A, and a male screw 9C provided at a distal end side of this shaft portion 9A.

The shaft portion 9A of the crank shaft 9 is inserted through the crank bearing 8 attached to the bearing support portion 7A of the connection rod 7, and the male screw 9C of the crank shaft 9 is threadably engaged with a crank shaft hole 26 of the balance weight 21, which will be described below. By that, the crank shaft 9 allows the bearing support portion 7A of the connection rod 7 to be rotatably disposed at a position radially eccentric from the axis O-O of the rotational shaft 11 (a position of an axis O2-O2 of the crank shaft hole 26, which will be described below).

Next, a configuration of the electric motor 10 including the rotational shaft 11 will be described. The rotational shaft 11 will be described below. This electric motor 10 functions as a driving source of the reciprocating air compressor 1, and is attached to the motor attachment surface 2B of the crank case 2. The electric motor 10 is formed by placing a rotor 10B made of a coil and a state 10C made of a permanent magnet in a cylindrical lidded motor case 10A disposed coaxially with the axis O-O of the rotational shaft 11. Further, a commutator 10D, which serves as a receiver of power, is provided at the rotor 10B. A plurality of brushes 10E (only one of them is illustrated) for supplying power in sliding contact with this communicator is disposed around this communicator 10D.

Then, the electric motor 10 is integrally attached to the crank case 2 by attachment of the opening side of the motor case 10A to the motor attachment surface 2B with use of a screw member (not illustrated).

Then, when the electric motor 10 is rotationally drive, cooling wind (not illustrated) is generated so as to flow from the motor case 10A toward inside the crank case 2 or from the crank case 2 toward the motor case 10A, and the electric motor 10, the crank bearing 8 in the crank chamber 2E, and the like are cooled down by this cooling wind.

The rotational shaft 11 is disposed in the motor case 10A of the electric motor 10, and extends straight along the axis O-O as a central line thereof. The rotor 10B is integrally attached on an outer peripheral side of the rotational shaft 11. One end 11A of the rotational shaft 11 in a length direction is rotatably supported by a cover portion of the motor case 10A via a rotational shaft bearing 12. On the other hand, an opposite end 11B of the rotational shaft 11 in the length direction is rotatably supported by the bearing support portion 2D in the crank case 2E of the crank case 2 via the rotational shaft bearing 13. By this configuration, the rotational shaft 11 is rotationally driven around the axis O-O as a central axis thereof in a double-supported state where the both ends in the length direction are supported.

Further, the opposite end 11B side of the rotational shaft 11 forms a tapered diameter-reduced portion 11C, and a male screw 11D is provided at a further distal end side of this diameter-reduced portion 11C in a coaxially protruding manner. This male screw 11D allows the balance weight 21 to be integrally rotatably fixed to the opposite end side 11B of the rotational shaft 11 by being threadably engaged with a rotational shaft hole 24 of the balance weight 21.

The air dryer 14 (refer to FIG. 1) mounted at the cylinder head 4 includes a dryer case 14A made of a hollow sealingly closed container, a water absorbent 14B contained in this dryer case 14A and including a desiccant such as silica gel, and a supply/discharge port 14C for drying air. The dryer case 14A of the air dryer 14 is attached to the connection portion 4D of the cylinder head 4. Then, the air dryer 14 functions to supply and discharge compressed air in a dried state (the dried air) when supplying the compressed air to a plurality of air suspensions (any of them is not illustrated) from the air compressor 1.

Next, a configuration of the balance weight 21, which is a portion that characterizes the present embodiment, will be described in detail.

Figure 3:
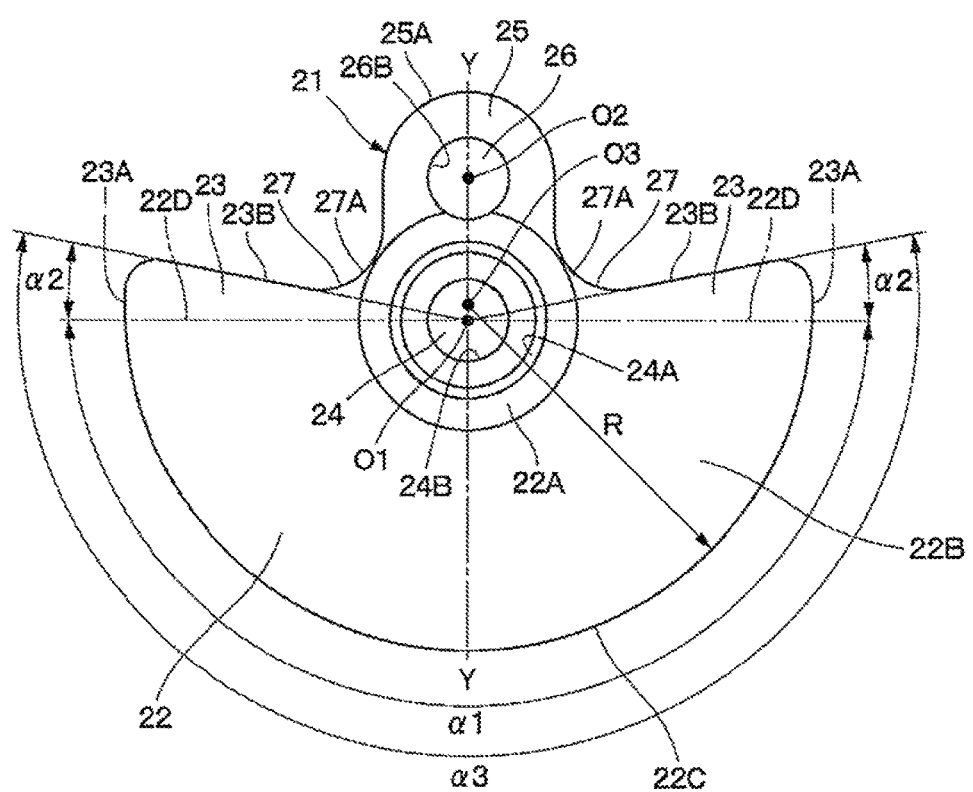
FIG. 3 is a front view of the balance weight as viewed from a III-III direction indicated by arrows in FIG. 2.

The balance weight 21 is integrally rotatably attached to the opposite end 11B of the rotational shaft 11 so as to be located in the crank chamber 2E of the crank case 2. As illustrated in FIG. 3, the balance weight 21 is formed orthogonally to the axis O1-O1 of the rotational shaft hole 24, which will be described below, and bisymmetrically about a straight line Y-Y passing through the axis O2-O2 (the shaft center O2) of the crank shaft hole 26. This balance weight 21 is a weight for balancing a moment generated when the rotational shaft 11 rotates, and includes a main weight portion 22, a pair of extension weight portions 23, the rotational shaft hole 24, a crank shaft attachment protrusion 25, the crank shaft hole 26, and a pair of spaces 27 as illustrated in FIGS. 2 to 5. Further, the balance weight 21 includes the main weight portion 22, the pair of extension weight portions 23, and the crank shaft attachment protrusion 25 formed integrally with one another.

The main weight portion 22 is attached to the opposite end 11B of the rotational shaft 11. This main weight portion 22 includes a cylindrical portion 22A at a position where the rotational shaft 11 is attached, and an inner peripheral side of this cylindrical portion 22A forms the rotational shaft hole 24, which will be described below. Further, a fan-shaped portion 22B is provided to the main weight portion 22 so as to be located around the cylindrical portion 22A. Further, a circumferential ridge of the fan-shaped portion 22B forms a circular-arc circumferential edge 22C shaped like a circular arc.

Then, in the balance weight 21, the main weight portion 22 is set to extend over a fan angle α1 of approximately 180 degrees, and is set as a range between the circular-arc circumferential ridge 22C and a pair of virtual end surfaces 22D (illustrated as an alternate long and short dash line in FIG. 3) defined at positions of torn ends of this circular-arc circumferential edge 22C orthogonally to the above-described straight line Y-Y. This pair of vertical end surfaces 22D serves as a borderline between the main weight portion 22 and each of the extension weight portions 23.

The fan-shaped portion 22B forming the main weight portion 22 has a size (a weight) defined by a radius dimension R and the like, and this radius dimension R is set to a value that is large but fails within a range that keeps the circular-arc circumferential ridge 22C of the main weight portion 22 from interfering with the crank case 2 when the balance weight 21 rotates in this crank case 2. Further, the fan-shaped portion 22B is formed as a thick plate member so as to be able to secure a sufficient weight even with the small radius dimension R.

In the first embodiment, the fan-shaped portion 22B is formed in such a manner that the fan angle α1 that is an angle when the fan is unfolded around a central point O3, which will be described below, ranges over approximately 180 degrees, i.e., the fan-shaped portion 22B is formed into a generally semi-circular shape symmetric about the above-described straight line Y-Y. Then, as illustrated in FIG. 3, the fan-shaped portion 22B is shaped like a circular-arc centered at a rotational shaft 11 side. In this case, a center on the rotational shaft 11 side refers to around a center including a position of the axis O1-O1 (the shaft center O1) of the rotational shaft hole 24 coinciding with the axis O-O of the rotational shaft 11 and a vicinity thereof in the main weight portion 22.

Therefore, the fan-shaped portion 22B according to the first embodiment is shaped like a circular arc shape centered at the central point O3 located close to the shaft center O1 of the rotational shaft hole 24. This central point O3 serves as a center of the circular arc of the circular-arc circumferential edge 22C of the main weight portion 22 forming the balance weight 21. The central point O3 is provided so as to be located on the straight line Y-Y and positioned offset from the shaft center O1 of the rotational shaft hole 24 toward the shaft center O2 of the crank shaft hole 26. As a result, the fan-shaped portion 22B is formed as a fan-shaped body including the circular-arc circumferential edge 22C shaped like the circular arc drawn around the central point O3 with the radius dimension R. In this manner, positioning the central point O3 of the circular-arc circumferential edge 22C offset toward the crank start hole 26 side allows a center or mass to be set at an appropriate position while allowing an angle α2 to be set to a nice round value at the time of manufacturing.

The fan-shaped portion 22B can also be formed in such a manner that the central point of the radius dimension R is set to a position offset from the shaft center O1 of the rotational shaft hole 24 to an opposite side from the crank shaft hole 26 as long as the fan-shaped portion 22B is configured in such a manner that the central point of the radius dimension R matches the shaft center O1 of the rotational shaft hole 24 or is located near the rotational shaft hole 24.

The pair of extension weight portions 23 is provided so as to extend from the virtual end surfaces 22D forming the main weight portion 22 to an opposite circular-arc side from the circular-arc circumferential edge 22C on both sides of the rotational shaft 11, i.e., the axis O1-O1 of the rotational shaft hole 24. A radially outer side and a crank shaft hole 26 side of each of the extension weight portions 23 form a circular-arc circumferential edge 23A and an inclined end surface 23B, respectively.

In this case, the inclined end surface 23B of each of the pair of extension weight portions 23 is formed by extending the main weight portion 22 from the virtual end surface 22D of the main weight portion 22 to the crank shaft hole 26 side by a length as long as the fan angle α2. The pair of extension weight portions 23 is formed, bisymmetrically about the straight line Y-Y, but can also be formed in such a manner that the left and right extension weight portions have different fan angles and/or shapes from each other Further, the circular-arc circumferential edge 23A of each of the extension weight portions 23 is seamlessly connected to the circular-arc circumferential edge 22C of the main weight portion 22, and the crank shaft hole 26 side thereof forms the inclined end surface 23B. By this configuration, the respective inclined end surfaces 23B of the individual extension weight portions 23 are formed into a V shape bent around the straight line Y-Y. In addition, each of the extension weight portions 23 is formed as a thick plate member so as to be able to secure a sufficient weight similarly to the main weight portion 22, and therefore the main weight portion 22 and the pair of extension weight portions 23 are formed as a single plate-like member.

Now, the shapes of the fan-shaped portion 22B of the main weight portion 22 and the pair of extension weight portions 23 forming the balance weight 21 will be described in detail.

The shapes (sizes and weights) of the fan-shaped portion 22B of the main weight portion 22 and the pair of extension weigh portions 23 are set based on a force of inertia for keeping balance when the piston 6 reciprocates (a value proportional to a dimension of a distance from the shaft center O1 of the rotational shaft hole 24 to the position of the center of mass of the balance weight 21), and a moment of inertia for smoothing the rotational motion.

Figure 6:
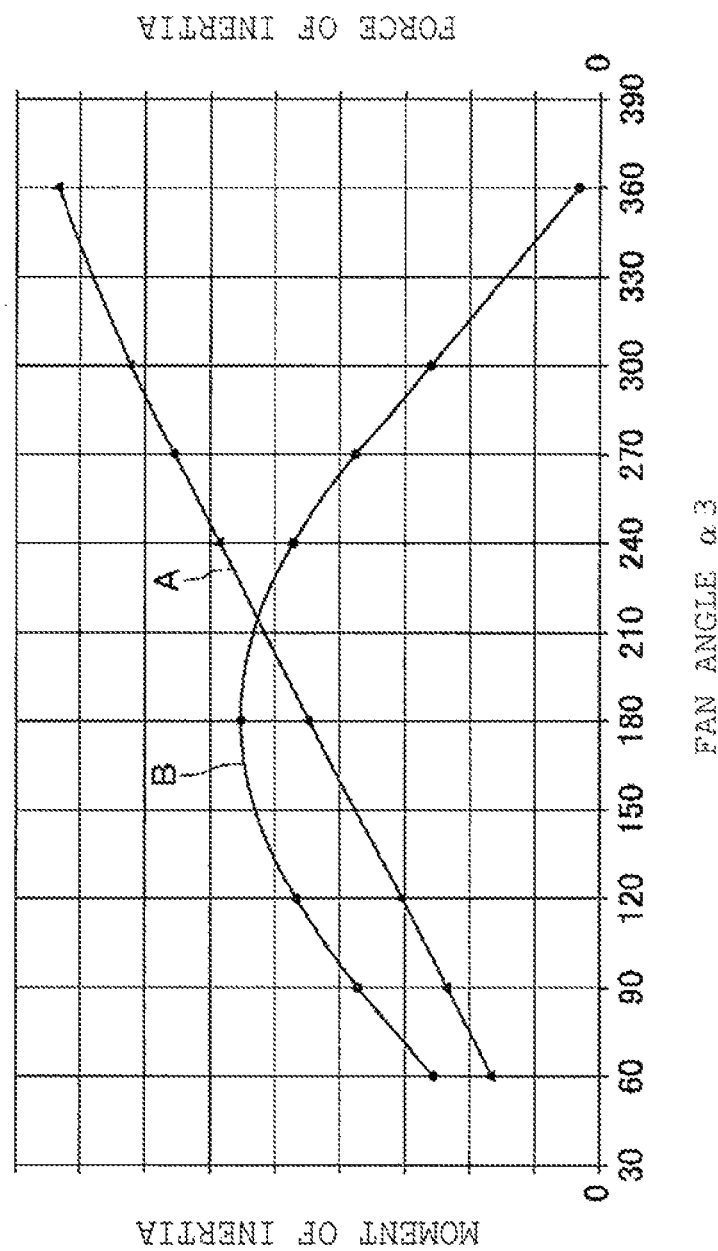
FIG. 6 illustrates a graph indicating characteristic lines of values of a moment of inertia and a force of inertia with respect to a fan angle of the balance weight.

In other words, if the fan angle α3 of the entire balance weight 21, which is acquired by adding the fan angle α1 of the fan-shaped portion 22B of the main weight portion 22 and the respective fan angles α2 of the extension weight portions 23 (α3=α1+α2×2), is 180 degrees or smaller, the balance weight 21 fails to acquire a heavy weight, thereby reducing a value of the moment of inertia undesirably as indicated by a characteristic line A illustrated in FIG. 6.

On the other hand, if the fan angle α3 exceeds 180 degrees, a value of the force of inertia reduces undesirably as indicated by a characteristic line B in FIG. 6. However, even when the fan angle α3 is set to a value significantly exceeding 180 degrees, such as a value close to 360 degrees, a sufficient force of inertia can be acquired by performing partial hole drilling, thinning processing, or the like. Therefore, the fan angle α3, which is the sum of the main weight portion 22 and the pair of extension weight portions 23, is set as indicated by the following equation 1.

$$180 < \text{degrees} < \alpha 3 < 360 \text{ degrees} \quad \text{EQUATION 1}$$

preferably, $$190 \text{degrees} <= \alpha 3 <= 240 \text{ degrees}$$

In this manner, setting the fan angle α3 of the entire balance weight 21 allows the balance weight 21 to acquire the force of inertia and the moment of inertia, and also keep the weight to a required minimum weight, thereby achieving a reduction in the weight of the reciprocating air compressor 1.

The rotational shaft hole 24 is provided at the main weight portion 22 so as to have the axis O1-O1 on the central side of the circular arc of the circular-arc circumferential edge 22C of the main weight portion 22, i.e., inside the cylindrical portion 22A. This rotational shaft hole 24 is configured to be coaxially attached to the rotational shaft 11. The rotational shaft hole 24 is configured to be coaxially attached to the opposite end 11B side of the rotational shaft 11, and therefore includes a tapered surface 24A configured in such a manner that the diameter-reduced portion 11C of the rotational shaft 11 is fittedly inserted therein while being located on the electric motor 10 side, and a female screw 24B configured in such a manner that the male screw 11D is threadably engaged therewith while being located at a deep portion of this tapered surface 24A.

Figure 4:
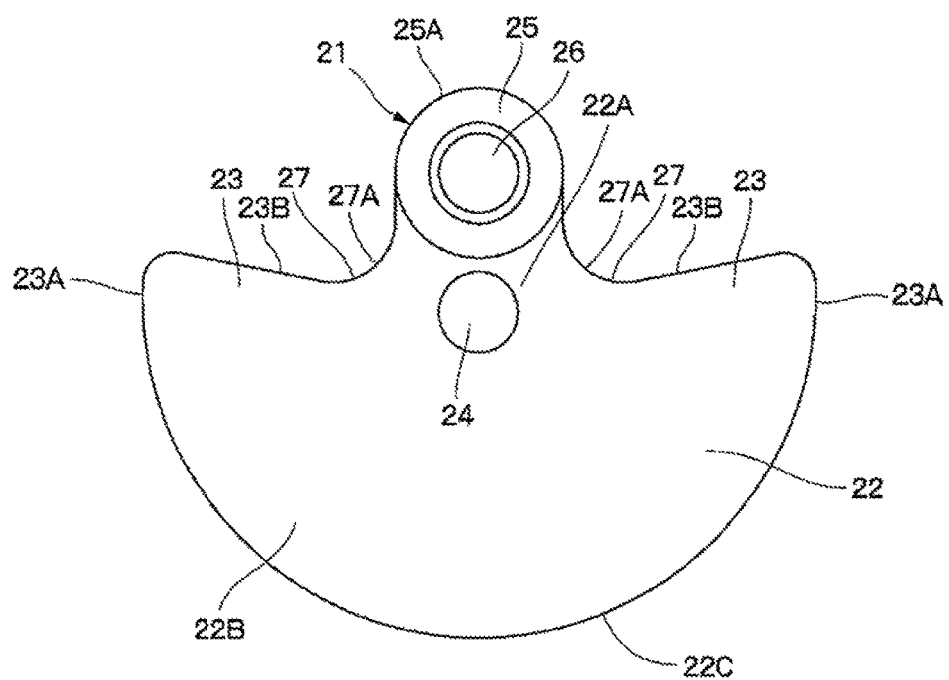
FIG. 4 is a rear view of the balance weight as viewed from a IV-IV direction indicated by arrows in FIG. 2.
Figure 5:
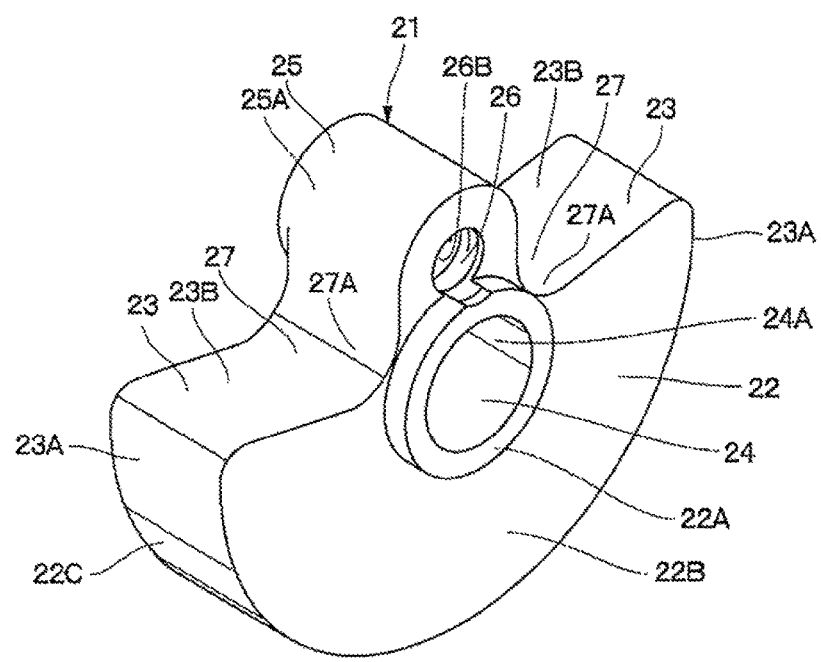
FIG. 5 is a perspective view illustrating the balance weight alone.

The crank shaft attachment protrusion 25 is provided so as to protrude from the rotational shaft hole 24 to the opposite circular-arc side. More specifically, as illustrated in FIGS. 3 to 5, the crank shaft attachment protrusion 25 is formed as a protrusion having a generally U-shaped outer peripheral surface 25A protruding from an outer periphery of the cylindrical portion 22A of the main weight portion 22 to the opposite side from the circular-arc circumferential edge 22C.

The crank shaft hole 26 is provided at the crank shaft attachment protrusion 25 radially eccentrically with respect to the rotational shaft hole 24. This crank shaft hole 26 has the axis O2-O2 (a shaft center O2). Further, the crank shaft hole 26 is configured in such a manner that the crank shaft 9 is coaxially attached thereto, and includes a fitted insertion portion 26A configured in such a manner that the shaft portion 9A of the crank shaft 9 is fittedly inserted therein while being located on an opposite side from the electric motor 10, and a female screw 26B configured in such a manner that the male screw 9C is threadably engaged therewith while being located at a deep portion of this fitted insertion portion 26A.

The pair of spaces 27 is formed at the balance weight 21 for guiding the cooling air to the crank bearing 8 rotatably supporting the connection rod 7 to the crank shaft 9. More specifically, each of the spaces 27 is configured to be able to cool the crank bearing 8 with the cooling wind generated when the reciprocating air compressor 1 is in operation by causing a part of the crank bearing 8 to be exposed.

The pair of spaces 27 is respectively formed between positions on both sides of the crank shaft attachment protrusion 25 and the pair of extension weight portions 23 so as to be positioned bisymmetrically about the straight line Y-Y. The pair of spaces 27 is configured to connect between the outer peripheral surface of 25A of the crank shaft attachment protrusion 25 and the inclined end surfaces 23B of the pair of extension weight portions 23 with concaved curved surfaces 27A each having a smooth concaved curved shape. This configuration can prevent a stress from being concentrated within each of the spaces 27 and improve workability of the balance weight 21.

Then, each of the spaces 27 can cause the crank bearing 8 to be exposed to inside the crank chamber 2E by being formed by cutting out a position of the main weight portion 22 close to the cylindrical portion 22A. Therefore, when the reciprocating air compressor 1 is in operation, heat of the crank bearing 8 can be released into the cooling wind, and this crank bearing 8 can be cooled down.

The oscillation-type reciprocating air compression 1 according to the first embodiment is configured in the above-described manner, and an operation thereof will be described next.

First, when the rotational shaft 11 is rotationally driven by the electric motor 10, the balance weight 21 rotates together with this rotational shaft 11, and the crank shaft 9 attached to this balance weight 21 pivotally operates. As a result, the piston 6 connected to the crank shaft 9 via the connection rod 7 reciprocates while oscillating in the cylinder, and alternately repeats the intake phase in which the piston 6 moves away from the cylinder head 4 and the discharge phase in which the piston 6 moves toward the cylinder head 4. In this intake phase, the external air is introduced into the compression chamber 3A of the cylinder 3 via the intake port 4A of the cylinder head 4. In the discharge phase, while the air in the compression chamber 3A is compressed by the piston 6, the compressed air is discharged by opening the discharge valve 4C. This discharged compressed air is supplied to each of the air suspensions via the supply/discharge port 14C as the sufficiently dried dried air by passing through inside the air dryer 14.

Further, when the piston 6 reciprocates in the cylinder 3, the balance weight 21 attached to the rotational shaft 11 rotates with an appropriate moment of inertia and an appropriate force of inertia, thereby absorbing a change in a load on the piston 6 side throughout from the intake phase to the discharge phase and thus stabilizing the pivotal operation of the crank shaft 9 and the rotational operation of the rotational shaft 11.

Further, when the reciprocating air compressor 1 is in operation, the cooling wind flows from the motor case 10A toward inside the crank case 2 or from the crank case 2 toward the motor case 10A by, for example, a cooling fan provided at the electric motor 10. As a result, the electric motor 10, the crank bearing 8 in the crank chamber 2E, and the like can be cooled down by the cooling wind.

Next, a comparison between the balance weight 21 according to the first embodiment illustrated in FIG. 3 and a balance weight 101 according to a comparative example illustrated in FIG. 10 will be described.

Figure 10:
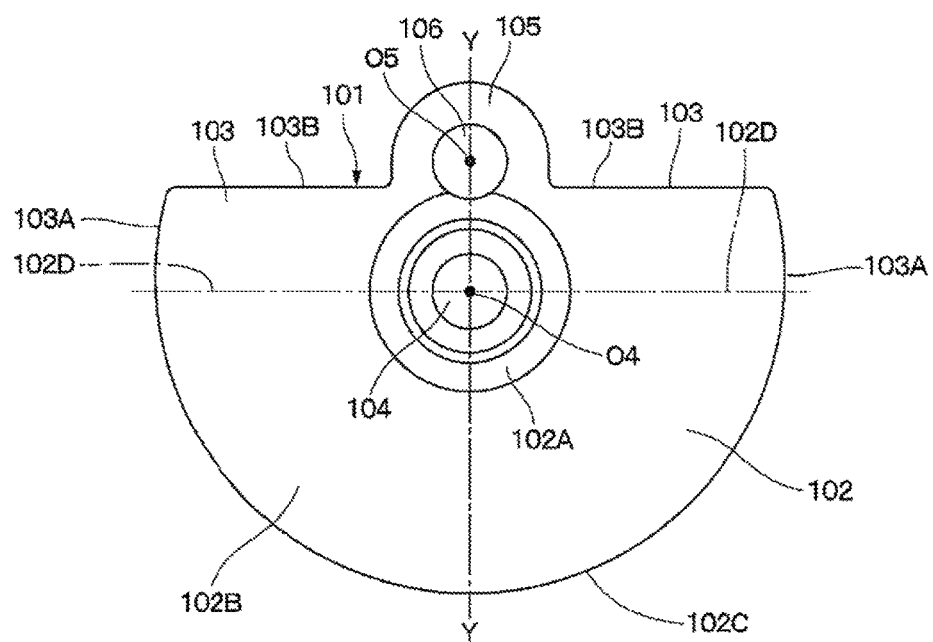
FIG. 10 is a front view illustrating a balance weight according to a comparative example as viewed from a similar position to FIG. 3.

First, as illustrated in FIG. 10, the balance weight 101 according to the comparative example includes a main weight portion 102, a pair of extension weight portions 103, a rotational shaft hole 104, a crank shaft attachment protrusion 105, and a crank shaft hole 106.

Similarly to the main weight portion 22 according to the first embodiment, the main weight portion 102 includes a cylindrical portion 102A at a position thereof to which the rotational shaft 11 is attached, and an inner peripheral side thereof forms the rotational shaft hole 104, which will be described below. Further, a fan-shaped portion 102B is provided to the main weight portion 102 so as to be located around the cylindrical portion 102A. This fan-shaped portion 102B is formed in such a manner that a fan angle ranges over approximately 180 degrees, i.e., the fan-shaped portion 102B is formed generally semi-circularly, and an outer peripheral side thereof forms a circular-arc circumferential edge 102C shaped like a circular arc. Further, virtual end surfaces 102D (illustrated as an alternate long and short dash line in FIG. 10) corresponding to a pair of end surfaces are provided to the main weight portion 102 at positions on the circular-arc circumferential edge 102C on both sides of the rotational shaft hole 104 so as to extend orthogonally to a straight line Y-Y. In this manner, the main weight portion 102 is provided in a range defined by the circular-arc circumferential edge 102C and the pair of virtual end surfaces 102D.

The pair of extension weight portions 103 is provided so as to extend from the virtual end surfaces 102D to a crank shaft hole 106 side while sandwiching a shaft center O4 of the rotational shaft hole 104, which will be described below, together with the fan-shaped portion 102B of the main weight portion 102. Each of the extension weight portions 103 includes a circular-arc circumferential edge 103A continuous from the circular-arc circumferential edge 102C of the main weight portion 102. However, each of the extension weight portions 103 according to the comparative example includes a straight-line end surface 103B straight and orthogonal to the straight line Y-Y as an edge extending on an opposite circular-arc side of the shaft center O4 of the rotational shaft hole 104, unlike each of the extension weight portions 23 according to the first embodiment.

Due to this configuration, the respective spaces 27 according to the first embodiment are not formed between the pair of extension weight portions 103 and the crank shaft attachment protrusion 105, which will be described below, and the cylindrical portion 102A is surrounded along an entire circumference thereof by the fan-shaped portion 102B and each of the extension weight portions 103.

The rotational shaft hole 104 is formed around the shaft center O4 on a central side of the circular arc of the circular-arc circumferential edge 102C of the main weight portion 102, i.e., inside the cylindrical portion 102B, similarly to the rotational shaft hole 24 according to the first embodiment.

The crank shaft attachment protrusion 105 is provided so as to protrude from the rotational shaft hole 104 to the opposite circular-arc side. The crank shaft hole 106 is formed at the crank shaft attachment protrusion 105 at a position of a shaft center O5 radially eccentric with respect to the rotational shaft hole 104, similarly to the crank shaft hole 26 according to the first embodiment.

The thus-configured balance weight 101 according to the comparative example can acquire an appropriate moment of inertia and an appropriate force of inertia due to the provision of the pair of extension weight portions 103 in addition to the main weight portion 102. As a result, the balance weight 101 can stabilize the pivotal operation of the crank shaft 9 and the rotational operation of the rotational shaft 11.

However, in the comparative example, the cylindrical portion 102A of she main weight portion 102 is brought into a state surrounded along the entire circumference thereof by the fan-shaped portion 102B and each of the extension weight portions 103 due to the formation of the edges of the pair of extension weight portions 103 as the straight-line end surfaces 103B. Therefore, the crank bearing 8, which is disposed so as to face the balance weight 101, is undesirably entirely covered by each of the extension weight portions 103. Therefore, this configuration makes difficult for the cooling wind to reach the crank bearing 8, resulting in the increase in the temperature of the crank bearing 8.

On the other hand, the balance weight 21 according to the present embodiment includes the main weight portion 22 extending over the range defined by the circular-arc circumferential edge 22C shaped like the circular arc centered at the rotational shaft hole 24 (the rotational shaft 11) side and the pair of virtual end surfaces 22D located on the circular-arc circumferential edge 22C on the both sides of the rotations shaft hole 24, the pair of extension weight portions 23 extending from tine pair of virtual end surfaces 22D of this main weight portion 22 to the opposite circular-arc side of the rotational shaft hole 24 from the circular-arc circumferential edge 22C, the rotational shaft hole 24 formed at the main weight, portion 22 so as to be located on the central side of the circular arc of the circular-arc circumferential edge 22C of the main weight portion 22 and attached to the rotational shaft 11, the crank shaft attachment protrusion 25 provided so as to protrude from this rotational shaft hole 24 to the opposite circular-arc side, the crank shaft hole 26 formed at this crank shaft attachment protrusion 25 radially eccentrically with respect to the rotational shaft hole 24, and the pair of spaces 27 respectively formed between the positions on the both sides of this crank shaft attachment protrusion 25 and the pair of extension weight portions 23.

As a result, the pair of spaces 27, which is formed by cutting out the main weight portion 22 at the positions close to the cylindrical portion 22A, can cause the crank bearing 8 to be exposed to inside the crank chamber 2E, thereby allowing the cooling wind to be guided to the crank bearing 8 via each of the spaces 27. Therefore, when the reciprocating air compressor 1 is in operation, the present embodiment can release the heat of the crank bearing 8 into the cooling wind while stablishing the pivotal operation of the crank shaft 9 and the rotational operation of the rotational shaft 11. As a result, the present embodiment can efficiently cool this crank bearing 8, thereby elongating a lifetime of the crank bearing 8.

Further, the main weight portion 22 and the pair of extension weight portions 23 are formed as a single plate-like member, which facilitates the provision of each of the extension weight portions 23 without increasing the number of processes therefor.

In addition, the balance weight 21 includes the main weight portion 22, the pair of extension weight portions 23, and the crank shaft attachment protrusion 25 integrally formed with one another, and therefore this balance weight 21 can be easily manufactured.

On the other hand, the pair of spaces 27 is configured to smoothly connect between the crank shaft attachment protrusion 25 and the pair of extension weight portions 23 via the concaved curved surfaces 27A. This configuration can prevent a stress from being concentrated at a position of each of the spaces 27, thereby enhancing stiffness. Further, this configuration can improve the workability at she time of molding processing using casting or the like Further, the central point O3 of the circular arc of the circular-arc circumferential edge 22C of the main weight portion 22 forming the balance weight 21 is positioned offset from the shaft center O1 of the rotational shaft hole 24 toward the shaft center O2 of the crank shaft hole 26. This configuration allows the center of mass to be set at an appropriate position while allowing the angle α2 to be set to a nice round value at the time of the manufacturing.

Figure 7:
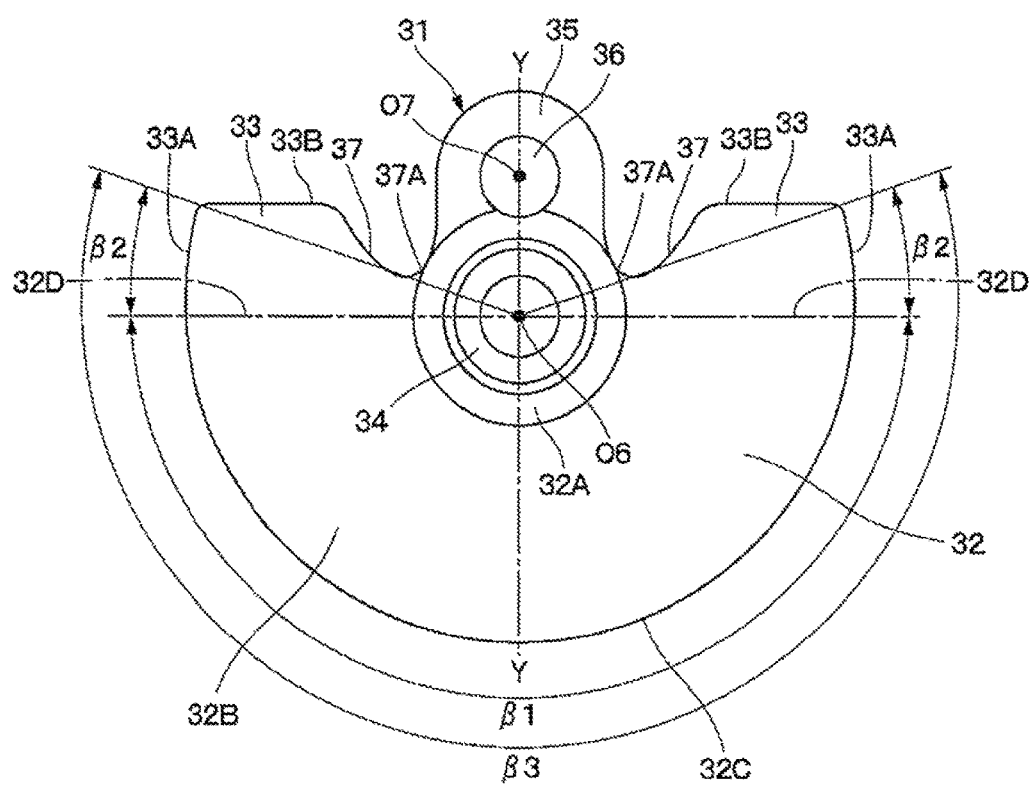
FIG. 7 is a front view illustrating a balance weight according to a second embodiment of the present invention as viewed from a similar position to FIG. 3.

Next, FIG. 7 illustrates, a second embodiment of the present invention. The present embodiment is characterized in that the pair of spaces is formed between the positions on the both sides of the crank shaft attachment protrusion and the pair of extension weight portions while the end surfaces of the pair of extension weight portions on the opposite circular-arc side are formed as straight-line end surfaces. A balance weight according to the second embodiment will be described, identifying similar components to the balance weight 21 according to the above-described first embodiment by reference numerals beginning with 31, and omitting descriptions thereof.

In FIG. 7, a balance weight 31 according to the second embodiment includes a main weight portion 32, a pair of extension weight portions 33, a rotational shaft hole 34, a crank shaft attachment protrusion 35, a crank shaft hole 36, and a pair of spaces 37.

The main weight portion 32 according to the second embodiment includes a cylindrical portion 32A, a fan-shaped portion 32B, a circular-arc circumferential edge 32C, and a pair of virtual end surfaces 32D (illustrated as an alternate long and short dash line in FIG. 7), similarly to the main weight portion 22 according to the first embodiment. By this configuration, the main weight portion 32 is formed into a semi-circular shape having a fan angle β1 ranging over approximately 180 degrees as a whole.

The pair of extension weight portions 33 according to the second embodiment is provided so as to extend from the pair of virtual end surfaces 32D to the crank shaft hole 36 side while sandwiching a shaft center O6 of a rotational shift hole 34, which will be described below, together with the fan-shaped portion 32B of the main weight portion 32. Each of the extension weight portions 33 includes a circular-arc circumferential edge 33A continuous from the circular-arc circumferential edge 32C of the main weight portion 32.

Then, each of the extension weight portions 33 according to the second embodiment is configured in such a manner that an edge thereof extending on an opposite circular-arc side of the shaft center O6 of the rotational shaft hole 34 forms a straight-line end surface 33B straight and orthogonal to a straight line Y-Y orthogonal to the shaft center O6 of the rotational shaft hole 34 and passing through a shaft center O7 of the crank shaft hole 36. In this case, the straight-line end surface 33B of each of the pair of extension weight portions 23 is formed by extending a corner position on an outer diameter side from the virtual end surface 32D of the main weight portion 32 to the crank shaft hole 36 side by a length as long as a fan angle β2. By this configuration, the main weight portion 32 and each of the extension weight portions 33 according to the second embodiment are termed in such a manner that a fan angle β3 of the entire balance weight 31 ($β3=β1+β2×2$) is set over a similar angular range to the fan angle α3 of the balance weight 21 according to the first embodiment.

The rotational shaft hole 34 is formed around the shaft center O6 on a central side of the circular arc of the circular-arc circumferential edge 32C of the main weight portion 32, i.e., inside the cylindrical portion 32A located on the straight line Y-Y, similarly to the rotational shaft hole 24 according to the first embodiment.

The crank shaft attachment protrusion 35 is provided so as to protrude from, the rotational shaft hole 34 to the opposite circular-arc side. The crank shaft hole 36 is formed at the crank shaft attachment protrusion 33 at a position of the shaft center O7 radially eccentric with respect to the rotational shaft hole 34, similarly to the crank shaft hole 26 according to the first embodiment.

The pair of spaces 37 functions to guide the cooling wind to the crank bearing 8, and is formed at the balance weight 31. The individual spaces 37 are formed between positions on both sides of the crank shaft attachment protrusion 35 and the pair of extension weight portions 33, respectively. The pair of spaces 37 is formed by connecting the crank shaft attachment protrusion 35 and the straight-line end surfaces of the pair of extension weight portions 33 with concaved curved surfaces 37A each having a smooth concaved curved shape. This configuration can prevent a stress from being concentrated within each of the spaces 37 and improve workability when molding the balance weight 31.

Then, each of the spaces 37 can cause the crank bearing 8 to be exposed to inside the crank chamber 2E by being formed by cutting out the main weight portion 32 at positions close to the cylindrical portion 32A. Therefore, when the reciprocating air compressor 1 is in operation, the heat of the crank bearing 8 can be released into the cooling wind, and this crank bearing 8 can be cooled down.

In this manner, the thus-configured second embodiment can also acquire approximately similar advantageous effects to the above-described first embodiment. Especially according to the second embodiment, the spaces 37 are formed between the positions on the both sides of the crank shaft attachment protrusion 35 and the pair of extension weight portions 33, which allows the crank bearing 8 to be exposed to inside the crank chamber 2E. When the reciprocating air compressor 1 is in operation, the present embodiment can release the heat of the crank bearing 8 into the cooling wind, to cool the crank bearing 8 while stabilizing the pivotal operation of the crank shaft 9 and the rotational operation of the rotational shaft 11. Further, each of the spaces 37 smoothly connects between the crank shaft attachment protrusion 35 and the pair of extension weight portions 33 with the concaved curved surface 37A, which can prevent the concentration of the stress and thus enhance the stiffness.

Figure 8:
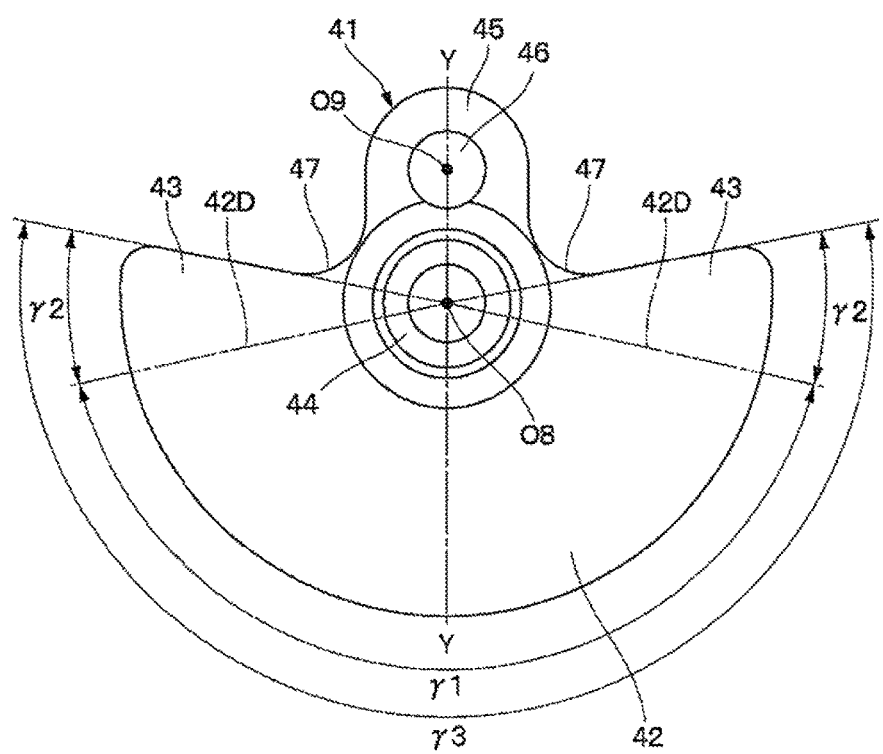
FIG. 8 is a front view illustrating a balance weight according to a third embodiment of the present invention as viewed from a similar position to FIG. 3.

Next, FIG. 8 illustrates a third embodiment of the present invention. The present embodiment is characterized in that the fan angle of the main weight portion is set to 180 degrees or smaller. A balance weight according to the third embodiment will be described, identifying similar components to the balance weight 21 according to the above-described first embodiment by reference numerals beginning with 41, and omitting descriptions thereof.

In FIG. 8, a balance weight 41 according to the third embodiment includes a main weight portion 42, a pair of extension weight portions 43, a rotational shaft hole 44 having a shaft center O8, a crank shaft attachment protrusion 45, a crank shaft hole 46 having a shaft center O9, and a pair of spaces 47, approximately similar to the balance weight 21 according to the first embodiment. However, the balance weight 41 according to the third embodiment is different from the balance weight 21 according to the first embodiment in terms of such a configuration that a fan angle $\gamma 1$ extending around the shaft center O8 of the main weight portion 42 to each of virtual end surfaces 42D is set to 180 degrees or smaller.

Then, a fan angle $\gamma 2$ of each of the pair of extension weight portions 43 is set to a larger value than the fan angle $\alpha 2$ of the extension weight portion 23 according to the first embodiment. By this configuration, the main weight portion 42 and each of the extension weight portions 43 according to the third embodiment are formed in such a manner that a fan angle $\gamma 3$ of the entire balance weight 41 ($\gamma 3 = \gamma 1 + \gamma 2 \times 2$) is set over a similar angular range to the fan angle $\alpha 3$ of the entire balance weight 21 according to the first embodiment.

In this manner, the thus-configured third embodiment can also stabilize the pivotal operation of the crank shaft 9 and the rotational operation of the rotational shaft 11 due to each of the weight portions 42 and 43 when the reciprocating air compressor 1 is in operation, approximately similar to the above-described first embodiment. Besides that, the pair of spaces 47 can cause the heat of the crank bearing 8 to be released into the cooling wind to cool down the crank bearing 8.

Figure 9:
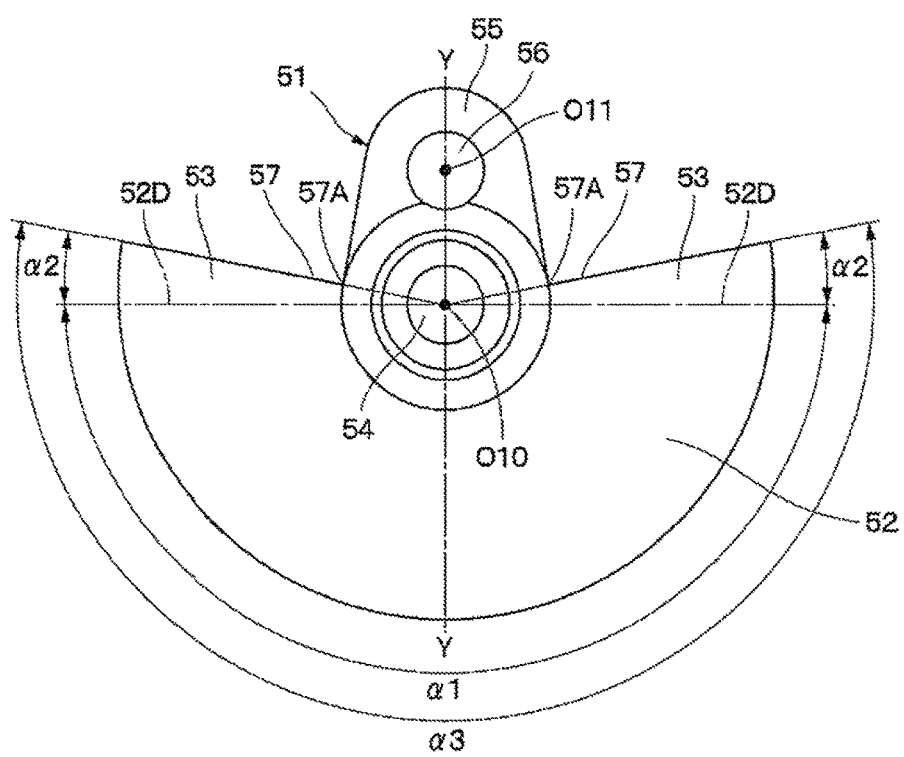
FIG. 9 is a front view illustrating a balance weight according to a fourth embodiment of the present invention as viewed from a similar position to FIG. 3.

Next, FIG. 9 illustrates a fourth embodiment of the present invention. The present embodiment is characterized in that portions between the crank shaft attachment protrusion and the pair of extension weight portions are formed as corner portions. A balance weight according to the fourth embodiment will be described, identifying similar components to the balance weight 21 according to the above-described first embodiment by reference numerals beginning with 51, and omitting descriptions thereof.

In FIG. 9, a balance weight 51 according to a fourth embodiment includes a main weight portion 52, a pair of extension weight portions 53 extending from virtual end surfaces 52D of the main weight portion 52, a rotational shaft hole 54 having a shaft center O10, a crank shaft attachment protrusion 55 protruding to an opposite circular-arc side, a crank shaft hole 56 having a shaft center O11, and a pair of spaces 57, approximately similarly to the balance weight 21 according to the first embodiment. However, the balance weight 51 according to the fourth embodiment is different from the balance weight 21 according to the first embodiment in terms of such a configuration that portions of the pair of spaces 57 between the crank shaft attachment protrusion 55 and the pair of extension weight portions 53 are formed as generally orthogonal corner portions 57A.

In this manner, the thus-configured fourth embodiment can also stabilize the pivotal operation of the crank shaft 9 and the rotational operation of the rotational shaft 11 due to each of the weight portions 52 and 53 when the reciprocating air compressor 1 is in operation, approximately similar to the above-described first embodiment. Besides that, the pair of spaces 57 can cause the heat of the crank bearing 8 to be released into the cooling wind to cool down the crank bearing 8.

In the first embodiment, the balance weight has been described assuming that the main weight portion 22 and the pair of extension weight portions 23 are formed as the single plate-like member as an example thereof. However, the present invention is not limited thereto, and may be configured in such a manner that, for example, the main weight portion 22 and the pair of extension weight portions 23 are prepared separately from each other, and are integrally attached to each other with use of a method such as welding and screwing. This configuration can also be applied to the other embodiments in a similar manner.

In the first embodiment, the balance weight has been described assuming that the circular-arc circumferential edge 22C of the main weight portion 22 is formed info the circular-arc shape drawn around the central point O3 with the radius dimension R. However, the present invention is not limited thereto, and, for example, the circular-arc circumferential edge may be formed into another shape, such as an elliptic shape having a varying radius dimension.

In the third embodiment, the balance weight has been described assuming that the fan angle $\gamma 1$ of the main weight portion 42 is set to 180 degrees or smaller as an example thereof. However, the present invention is not limited thereto, and may be configured in such a manner that the fan angle of the main weight portion is set to 180 degrees or larger. This configuration can also be applied to the other embodiments in a similar manner.

In each of the embodiments, the reciprocating compressor has been described referring to the oscillation-type piston 6 integrated with the connection rod 7 as an example of the piston. However, the present invention is not limited thereto, and may be applied to, for example, a reciprocating compressor configured in such a manner that the connection rod is rotatably connected to the piston with use of a pin.

On the other hand, in each of the embodiments, the reciprocating compressor has been described assuming that the electric motor 10 is provided integrally with the crank case 2 as an example thereof. However, the present invention is not limited thereto, and may be configured, in such a manner that the electric motor is prepared as a different member from the crank case, and a rotational force generated by the electric motor is transmitted to the rotational shaft with use of, for example, a belt.

In each of the embodiments, the reciprocating compressor has been described referring to the reciprocating air compression 1 mounted on the vehicle as an example thereof, but may be applied to a reciprocating compressor other than the reciprocating air compressor 1 designed to be mounted on the vehicle, such as a reciprocating compressor for use in a factory or a construction site.

Further, in each of the embodiments, the reciprocating compressor has been described referring to the reciprocating air compressor 1 for 3, the single piston 6, and the like, as an example thereof. However, the present invention is not limited thereto, and may be configured to be applied to, for example, a reciprocating air compressor for two-stage compression that includes two cylinders, two pistons, and the like, or a reciprocating air compressor that includes three or more cylinders, three or more pistons, and the like.

Next, an invention included in the above-described embodiments will be described. That is, according to the present invention, a main weight portion and a pair of extension weight portions are formed as a single plate-like member. By this configuration, each of the extension weight portions can be easily provided without increasing the number of processes when a balance weight is manufactured.

According to the present invention, the balance weight includes the main weight portion, the pair of extension weight portions, and a crank shaft attachment protrusion integrally formed with one another. By this configuration, the balance weight can be easily manufactured.

According to the present invention, a pair of spaces is formed into concaved curved shapes smoothly connecting between the crank shaft attachment protrusion and the pair of extension weight portions. By this configuration, the balance weight can prevent a stress from being concentrated at a position of each of the spaces, thereby enhancing stiffness. Further, the balance weight can achieve improved workability at the time of molding processing using casing or the like.

According to the present invention, a central point (O3) of a circular arc of a circular-arc circumferential edge of the balance weight is positioned offset from a shaft center (O1) of a rotational shaft hole toward a shaft center (O2) of a crank shaft hole. This configuration allows a center of mass to be set to an appropriate position while allowing the angle α2 to be set to a fine round value at the time of manufacturing.

REFERENCE SIGNS LIST 1 reciprocating air compressor
2 crank case
3 cylinder
6 piston
7 connection rod
8 crank bearing
9 crank shaft
10 electric motor
11 rotational shaft
21, 31, 41, 51 balance weight
22, 32, 42, 52 main weight portion
22C, 32C circular-arc circumferential edge
22D, 32D, 42D, 52D virtual end surface
23, 33, 43, 53 extension weight portion
24, 34, 44, 54 rotational shaft hole
25, 35, 45, 55 crank shaft attachment protrusion
26, 36, 46, 56 crank shaft hole
27, 37, 47, 57 space
27A, 37A concaved curved surface
O-O axis of rotational shaft
O1-O1 (O1) axis of rotational shaft hole (shaft center)
O2-O2 (O2) axis of crank shaft hole (shaft center)
O3 central point of circular arc of circular-arc circumferential edge
O6, O8, O10 shaft center of rotational shaft hole
O7, O9, O11 shaft center of crank shaft hole

The invention claimed is:
1. A reciprocating compressor comprising:
a crank case;
a cylinder attached to this crank case;
a piston reciprocatably fittedly inserted in this cylinder;
a connection rod extending from this piston;
a crank shaft inserted through one side of this connection rod via a bearing;
a rotational shaft configured to be rotationally driven by a motor; and
a balance weight attached to this rotational shaft with the crank shaft also attached thereto, the balance weight being configured to be usable to balance a moment generated when this rotational shaft rotates,
the balance weight including
a main weight portion extending over a range defined by a circular-arc circumferential edge shaped like a circular arc centered, at one side where the rotational shaft is located, and a pair of virtual end surfaces located on this circular-arc circumferential edge on both sides of the rotational shaft,
a pair of extension weight portions extending from the pair of virtual end surfaces of this main weight portion to an opposite circular-arc side from the circular-arc circumferential edge,
a rotational shaft hole provided at the main weight portion so as to be located on a central side of the circular arc of the circular-arc circumferential edge of the main weight portion, the rotational shaft hole being attached to the rotational shaft,
a crank shaft attachment protrusion provided so as to protrude from this rotational shaft hole to the opposite circular-arc side,
a crank shaft hole provided at this crank shaft attachment protrusion radially eccentrically with respect to the rotational shaft hole, and
a pair of spaces formed between positions on both sides of the crank shaft attachment protrusion and the pair of extension weight portions, respectively, for guiding cooling wind to the bearing of the crank shaft.
2. The reciprocating compressor according to claim 1, wherein the main weight portion and the pair of extension weight portions are formed as a single plate-like member.
3. The reciprocating compressor according to claim 1, wherein the balance weight includes the main weight portion, the pair of extension weight portions, and the crank shaft attachment protrusion formed integrally with one another.
4. The reciprocating compressor according to claim 1, wherein the pair of spaces is formed into concaved curved shapes smoothly connecting between the crank shaft attachment protrusion and the pair of extension weight portions.
5. The reciprocating compressor according to claim 1, wherein a central point (O3) of the circular arc of the circular-arc circumferential edge of the balance weight is positioned offset from a shaft center (O1) of the rotational shaft hole toward a shaft center (O2) of the crank shaft hole.

* * * * *